United States Patent
Kim

(10) Patent No.: US 9,371,629 B2
(45) Date of Patent: Jun. 21, 2016

(54) GOOD-EFFICIENCY RPM ZONE DISPLAY DEVICE FOR CONSTRUCTION MACHINERY

(75) Inventor: Hyun-Woo Kim, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 194 days.

(21) Appl. No.: 14/364,883

(22) PCT Filed: Dec. 15, 2011

(86) PCT No.: PCT/KR2011/009665
§ 371 (c)(1),
(2), (4) Date: Jun. 12, 2014

(87) PCT Pub. No.: WO2013/089293
PCT Pub. Date: Jun. 20, 2013

(65) Prior Publication Data
US 2014/0336905 A1 Nov. 13, 2014

(51) Int. Cl.
*F02D 28/00* (2006.01)
*E02F 9/26* (2006.01)
*B60K 35/00* (2006.01)

(52) U.S. Cl.
CPC . *E02F 9/26* (2013.01); *B60K 35/00* (2013.01); *F02D 28/00* (2013.01); *B60K 2350/1092* (2013.01)

(58) Field of Classification Search
CPC .......... F02D 28/00; F02D 41/021; E02F 9/26; E02F 9/2066; B60K 35/00; B60K 2350/1092
See application file for complete search history.

(56) References Cited

U.S. PATENT DOCUMENTS

| 6,826,465 | B2 | 11/2004 | Ishimoto et al. | |
| 8,720,629 | B2* | 5/2014 | Sohn | E02F 9/2066 180/170 |
| 2003/0001750 | A1 | 1/2003 | Ishimoto et al. | |
| 2013/0289834 | A1* | 10/2013 | Park | F02D 41/021 701/50 |
| 2014/0343829 | A1* | 11/2014 | Park | F02D 41/021 701/110 |

FOREIGN PATENT DOCUMENTS

| JP | 2001182560 A | 7/2001 |
| JP | 2003-220851 A | 8/2003 |
| KR | 10-1997-0044805 | 7/1997 |

(Continued)

OTHER PUBLICATIONS

International Search Report (in English and Korean) and Written Opinion of the International Searching Authority (in Korean) for PCT/KR2011/009665, mailed Aug. 7, 2012; ISA/KR.

*Primary Examiner* — Hieu T Vo
(74) *Attorney, Agent, or Firm* — Harness, Dickey & Pierce, P.L.C.

(57) ABSTRACT

An apparatus for displaying an RPM section having a good efficiency for a construction machine is disclosed, which includes a control unit outputting different control signals depending on whether a current engine RPM belongs to a predetermined RPM section having the good efficiency, and a good-efficiency display unit selectively turning on or off an LED lamp according to the control signal output from the control unit. Since the RPM section having the good efficiency of the construction machine equipment is defined and the LED lamp for indicating the good-efficiency state is turned on if the current engine RPM belongs to the RPM section, a client can finally achieve good fuel efficiency in using the construction machine equipment.

5 Claims, 2 Drawing Sheets

(56) References Cited

FOREIGN PATENT DOCUMENTS

| KR | 102002007626 A | 10/2002 |
| KR | 102003004493 A | 6/2003 |
| KR | 102007011189 A | 11/2007 |

* cited by examiner

GOOD-EFFICIENCY RPM ZONE DISPLAY DEVICE FOR CONSTRUCTION MACHINERY

TECHNICAL FIELD

The present invention relates to an apparatus for displaying an RPM section having a good efficiency for a construction machine. More particularly, the present invention relates to an apparatus for displaying an RPM section having a good efficiency for a construction machine, which defines the RPM section having the good efficiency of the construction machine equipment and turns on an LED lamp to finally enable a client to achieve a good fuel efficiency in using the equipment if the current engine RPM belongs to the RPM section.

BACKGROUND ART

In most construction machines, an RPM section having a good efficiency is set in consideration of workability of an engine against fuel consumption. This section is defined by software, and if an engine RPM comes into the defined section during an operation of the construction machine equipment, an LED for indicating a good-efficiency state may be turned on. Accordingly, an operator can achieve good fuel efficiency at low cost and without any trouble due to this function.

DISCLOSURE

Technical Problem

Therefore, the present invention has been made to solve the above-mentioned problems occurring in the related art, and one subject to be achieved by the present invention is to provide an apparatus for displaying an RPM section having a good efficiency for a construction machine, which can guide an operator to use an RPM section having good workability against fuel consumption during an operation of the equipment, and thus can improve the fuel efficiency of the equipment.

Technical Solution

In accordance with an aspect of the present invention, an apparatus for displaying an RPM section having a good efficiency for a construction machine includes a control unit outputting different control signals depending on whether a current engine RPM belongs to a preset RPM section having the good efficiency; and a good-efficiency display unit selectively turning on or off an LED lamp according to the control signal output from the control unit.

Preferably, the apparatus for displaying an RPM section having a good efficiency according to the aspect of the present invention further includes at least one of an engine ECU inputting current engine RPM information, a request output means provided in the control unit itself to output request engine RPM information, and a calculation means for calculating the current engine RPM using the current rotating frequency of an alternator and a ratio of the engine RPM to the rotating frequency.

Preferably, the control unit includes a setting unit setting the RPM section having the good efficiency; a comparison unit comparing the set RPM section having the good efficiency with the current engine RPM; a determination unit determining whether the current engine RPM belongs to the preset RPM section having the good efficiency according to the result of the comparison performed by the comparison unit; and a control signal output unit outputting an ON-demand signal to the good-efficiency display unit if the current engine RPM belongs to the preset RPM section having the good efficiency as the result of the determination performed by the determination unit, while outputting an OFF-demand signal to the good-efficiency display unit if the current engine RPM does not belong to the preset RPM section having the good efficiency.

Preferably, the good-efficiency display unit further includes an LED lamp driving unit turning on the LED lamp when the ON-command signal is input from the control signal output unit and turning off the LED lamp when the OFF-command signal is input from the control signal output unit.

Advantageous Effect

According to the present invention, since the RPM section having the good efficiency of the construction machine equipment is defined and the LED lamp for indicating the good-efficiency state is turned on if the current engine RPM belongs to the RPM section, the operator can finally achieve the good fuel efficiency in using the equipment.

In a state where it is not known which section has the good efficiency due to a narrow experience of the construction equipment or a change of a class of the existing equipment, the present invention can guide the operator to use the RPM section having the good efficiency, and thus the fuel efficiency of the equipment against the entire use time of the equipment can be improved.

BRIEF DESCRIPTION OF THE DRAWINGS

The above objects, other features and advantages of the present invention will become more apparent by describing the preferred embodiments thereof with reference to the accompanying drawings, in which.

BEST MODE

Figure 1:
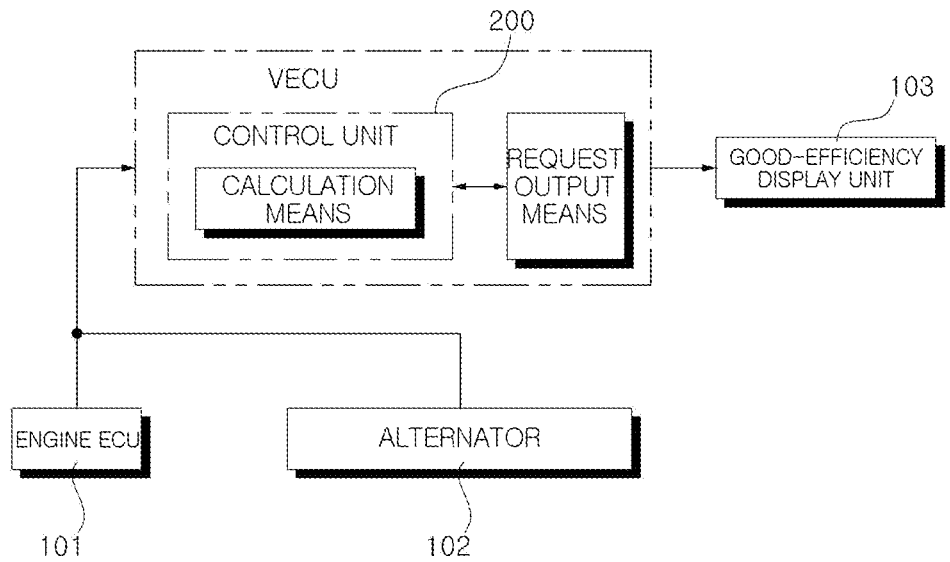
FIG. 1 is a block diagram illustrating the configuration of an apparatus for displaying an RPM section having a good efficiency for a construction machine according to a preferred embodiment of the present invention.

Hereinafter, a preferred embodiment of the present invention will be described in detail with reference to the accompanying drawings.

The matters defined in the description, such as the detailed construction and elements, are nothing but specific details provided to assist those of ordinary skill in the art in a comprehensive understanding of the invention, and the present invention is not limited to the embodiments disclosed hereinafter.

For an accurate explanation of the present invention, portions that are not related to the explanation are omitted, and in the entire description of the present invention, similar reference numerals are used for the similar elements. In the entire description and claims of the present invention, the term "comprises" and/or "includes" means that one or more other constituent elements are not excluded in addition to the described constituent elements.

FIG. 1 is a block diagram illustrating the configuration of an apparatus for displaying an RPM section having a good efficiency for a construction machine according to a preferred embodiment of the present invention.

As illustrated in FIG. 1, an apparatus for displaying an RPM section having a good efficiency for a construction machine includes a VECU including a control unit 200 outputting different control signals depending on whether a current engine RPM belongs to a preset RPM section having the good efficiency; and a good-efficiency display unit 103 selectively turning on or off an LED lamp according to the control signal output from the control unit 200.

Preferably, the apparatus for displaying an RPM section having a good efficiency may further include at least one of an engine ECU 101 inputting current engine RPM information so that the control unit 200 can obtain the current engine RPM information, a request output means 210 provided in the control unit 200 itself to output request engine RPM information, and a calculation means 220 for calculating the current engine RPM using the current rotating frequency of an alternator and a ratio of the engine RPM to the rotating frequency.

Here, the control unit 200 sets an RPM section having a good efficiency (here, the RPM section having the good efficiency is internally defined by software (e.g., main software or dataset) of the VECU, and the section having the best workability against fuel consumption is determined as the RPM section with reference to a fuel map of an engine mounted in the construction machine). If the current engine RPM belongs to the preset RPM section having a good efficiency, the control unit 200 outputs an ON-demand signal to the good-efficiency display unit 103, while if the current engine RPM does not belong to the preset RPM section, the control unit 200 outputs an OFF-demand signal to the good-efficiency display unit 103.

The good-efficiency display unit 103 selectively turns on or off the LED lamp according to the control signal output from the control unit 200, and includes an LED lamp driving unit, which turns on the LED lamp if the ON-demand signal is input from a control signal output unit and turns off the LED lamp if the OFF-demand signal is input from the control signal output unit.

Hereinafter, the control unit of the apparatus for displaying an RPM section having a good efficiency for a construction machine of FIG. 1 according to an embodiment of the present invention will be described in more detail with reference to FIG. 2.

Figure 2:
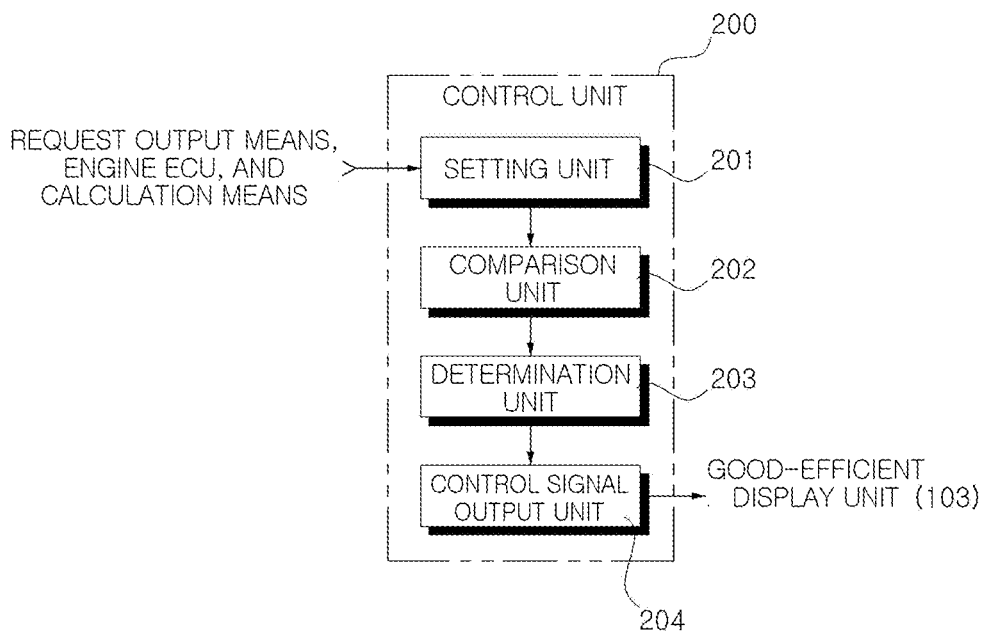
FIG. 2 is a block diagram illustrating the detailed configuration of a control unit according to an embodiment of the present invention.

FIG. 2 is a block diagram illustrating the detailed configuration of a control unit according to an embodiment of the present invention.

As illustrated in FIG. 2, the control unit 200 according to an embodiment of the present invention includes a setting unit 201, a comparison unit 202, a determination unit 203, and a control signal output unit 204.

That is, the control unit 200 includes the setting unit 201 setting the RPM section having the good efficiency, the comparison unit 202 comparing the set RPM section having the good efficiency with the current engine RPM, the determination unit 203 determining whether the current engine RPM belongs to the preset RPM section having the good efficiency according to the result of the comparison performed by the comparison unit 202, and the control signal output unit 204 outputting an ON-demand signal to the good-efficiency display unit 103 if the current engine RPM belongs to the preset RPM section having the good efficiency as the result of the determination performed by the determination unit 203, while outputting an OFF-demand signal to the good-efficiency display unit 103 if the current engine RPM does not belong to the preset RPM section having the good efficiency.

Here, the setting unit 201 defines and stores the RPM section having the good efficiency that is defined by a user.

The RPM section having the good efficiency is internally defined by software (e.g., main software or dataset) of the VECU, and the RPM section having the best workability against fuel consumption is determined as the RPM section with reference to the fuel map of an engine mounted in the construction machine.

The comparison unit 202 is installed between the setting unit 201 and the determination unit 203, and compares the current engine RPM with the RPM section having the good efficiency that is set by the setting unit 201 to output the result of the comparison. The comparison unit 202 receives the current engine RPM information from the engine ECU 101 inputting the current engine RPM, the request output means 210 provided in the control unit 200 itself to output the request engine RPM information, and the calculation means 220 for calculating the current engine RPM using the current rotating frequency of the alternator and the ratio of the engine RPM to the rotating frequency.

The determination unit 203 determines whether the current engine RPM belongs to the preset RPM section having the good efficiency according to the result of the comparison output from the comparison unit 202.

The control signal output unit 204 outputs the ON-demand signal to the good-efficiency display unit 103 if the current engine RPM belongs to the preset RPM section having the good efficiency as the result of the determination performed by the determination unit 203, and outputs the OFF-demand signal to the good-efficiency display unit 103 if the current engine RPM does not belong to the preset RPM section having the good efficiency.

Hereinafter, the operation of the apparatus for displaying an RPM section having a good efficiency for a construction machine according to the present invention of FIGS. 1 and 2 will be described in detail with reference to FIGS. 3 and 4.

Figure 3:
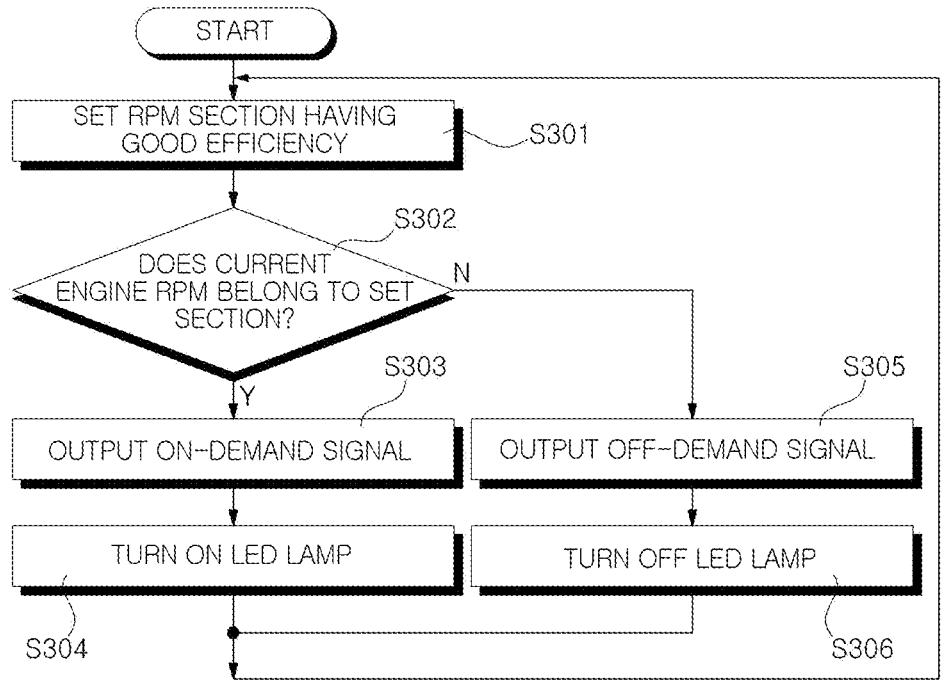
FIG. 3 is a flowchart illustrating in order the operation of an apparatus for displaying an RPM section having a good efficiency for a construction machine according to an embodiment of the present invention.
Figure 4:
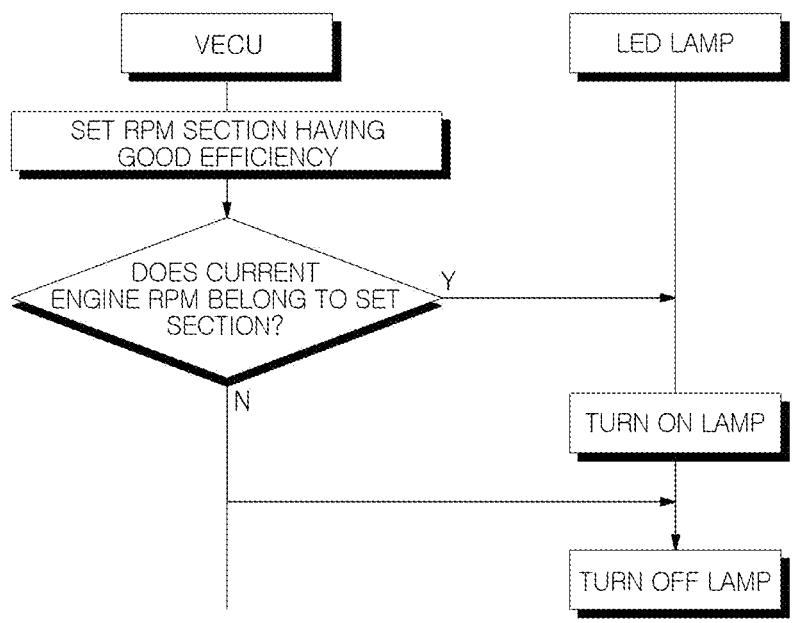
FIG. 4 is a procedural flowchart illustrating in order the operation of an apparatus for displaying an RPM section having a good efficiency for a construction machine according to an embodiment of the present invention.

FIG. 3 is a flowchart illustrating in order the operation of an apparatus for displaying an RPM section having a good efficiency for a construction machine according to an embodiment of the present invention, and FIG. 4 is a procedural flowchart illustrating in order the operation of an apparatus for displaying an RPM section having a good efficiency for a construction machine according to an embodiment of the present invention.

As illustrated in FIGS. 3 and 4, according to an embodiment of the present invention, the control unit 200 sets an RPM section having a good efficiency.

Then, if the current engine RPM belongs to the preset RPM section having the good efficiency, the control unit 200 outputs an ON-demand signal to the good-efficiency display unit 103, while if the current engine RPM does not belong to the preset RPM section having the good efficiency, the control unit 200 outputs an OFF-demand signal to the good-efficiency display unit 103.

The details thereof are as follows.

First, the RPM section having the good efficiency is set.

The RPM section having the good efficiency is internally defined by software (e.g., main software or dataset) of the VECU, and the RPM section having the best workability against fuel consumption is determined as the RPM section with reference to the fuel map of an engine mounted in the construction machine.

Then, the current engine RPM and the set RPM section having the good efficiency are compared with each other and the result of the comparison is output.

The control unit 200 receives the current engine RPM information from the engine ECU 101 inputting the current engine RPM, the request output means 210 provided in the control unit 200 itself to output the request engine RPM information, and the calculation means 220 for calculating the current engine RPM using the current rotating frequency of the alternator and the ratio of the engine RPM to the rotating frequency.

Then, it is determined whether the current engine RPM belongs to the preset RPM section having the good efficiency according to the result of the comparison.

If the current engine RPM belongs to the preset RPM section having the good efficiency as the result of the determination, the ON-demand signal is output to the good-efficiency display unit 103.

Further, if the current engine RPM does not belong to the preset RPM section having the good efficiency, the OFF-demand signal is output to the good-efficiency display unit 103.

Last, the good-efficiency display unit 103 selectively turns on or off the LED lamp according to the control signal output from the control unit 200.

That is, if the ON-demand signal is input from the control signal output unit, the LED lamp is turned on.

If the OFF-demand signal is input from the control signal output unit, the LED lamp is turned off.

The LED lamp may emit green light. The color of the light emitted from the LED lamp may be variously modified without departing from the technical concept of the present invention.

As described above, according to the present invention, if the current engine RPM of the construction machine belongs to the preset RPM section having the good efficiency, the LED lamp for indicating the good-efficiency state is turned on, and thus the operator can achieve good fuel efficiency at low cost.

INDUSTRIAL APPLICABILITY

As apparent from the above description, the present invention can be used in the apparatus for displaying an RPM section having a good efficiency for a construction machine, in which the operator can finally achieve the good fuel efficiency in using the equipment since the RPM section having the good efficiency of the construction machine equipment is defined and the LED lamp for indicating the good-efficiency state is turned on if the current engine RPM belongs to the defined RPM section.

The invention claimed is:

1. An apparatus for displaying an RPM section having a good efficiency for a construction machine, comprising:
   a control unit outputting different control signals depending on whether a current engine RPM belongs to a preset RPM section having the good efficiency; and
   a good-efficiency display unit selectively turning on or off an LED lamp according to the control signal output from the control unit.

2. The apparatus for displaying an RPM section having a good efficiency according to claim 1, further comprising at least one of an engine ECU inputting current engine RPM information, a request output means provided in the control unit itself to output request engine RPM information, and a calculation means for calculating the current engine RPM using the current rotating frequency of an alternator and a ratio of the engine RPM to the rotating frequency.

3. The apparatus for displaying an RPM section having a good efficiency according to claim 2, wherein the control unit comprises:
   a setting unit setting the RPM section having the good efficiency;
   a comparison unit comparing the set RPM section having the good efficiency with the current engine RPM;
   a determination unit determining whether the current engine RPM belongs to the preset RPM section having the good efficiency according to the result of the comparison performed by the comparison unit; and
   a control signal output unit outputting an ON-demand signal to the good-efficiency display unit if the current engine RPM belongs to the preset RPM section having the good efficiency as the result of the determination performed by the determination unit, while outputting an OFF-demand signal to the good-efficiency display unit if the current engine RPM does not belong to the preset RPM section having the good efficiency.

4. The apparatus for displaying an RPM section having a good efficiency according to claim 1, wherein the control unit comprises:
   a setting unit setting the RPM section having the good efficiency;
   a comparison unit comparing the set RPM section having the good efficiency with the current engine RPM;
   a determination unit determining whether the current engine RPM belongs to the preset RPM section having the good efficiency according to the result of the comparison performed by the comparison unit; and
   a control signal output unit outputting an ON-demand signal to the good-efficiency display unit if the current engine RPM belongs to the preset RPM section having the good efficiency as the result of the determination performed by the determination unit, while outputting an OFF-demand signal to the good-efficiency display unit if the current engine RPM does not belong to the preset RPM section having the good efficiency.

5. The apparatus for displaying an RPM section having a good efficiency according to claim 4, wherein the good-efficiency display unit further comprises an LED lamp driving unit turning on the LED lamp when the ON-command signal is input from the control signal output unit and turning off the LED lamp when the OFF-command signal is input from the control signal output unit.

* * * * *